Figure 3:
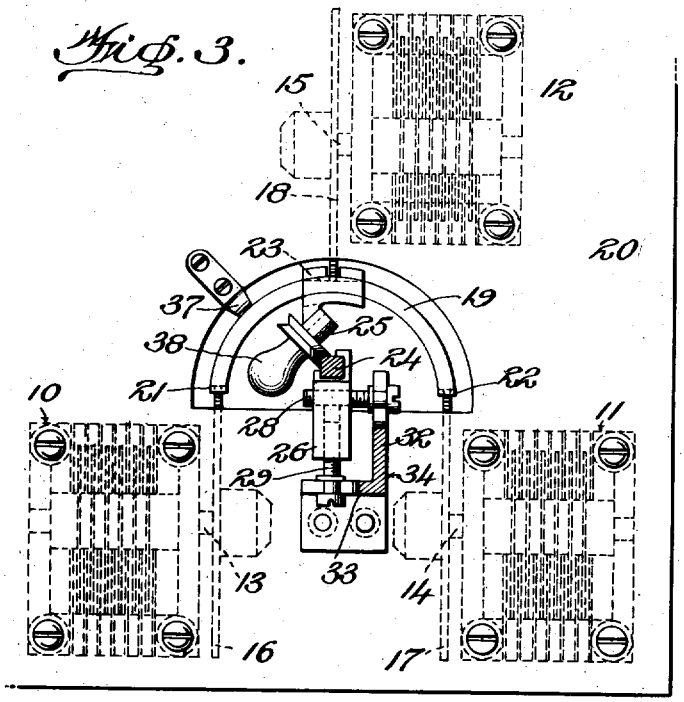

April 7, 1931. D. F. ASBURY Re. 18,023
RADIO APPARATUS
Original Filed Feb. 19, 1926 3 Sheets-Sheet 1
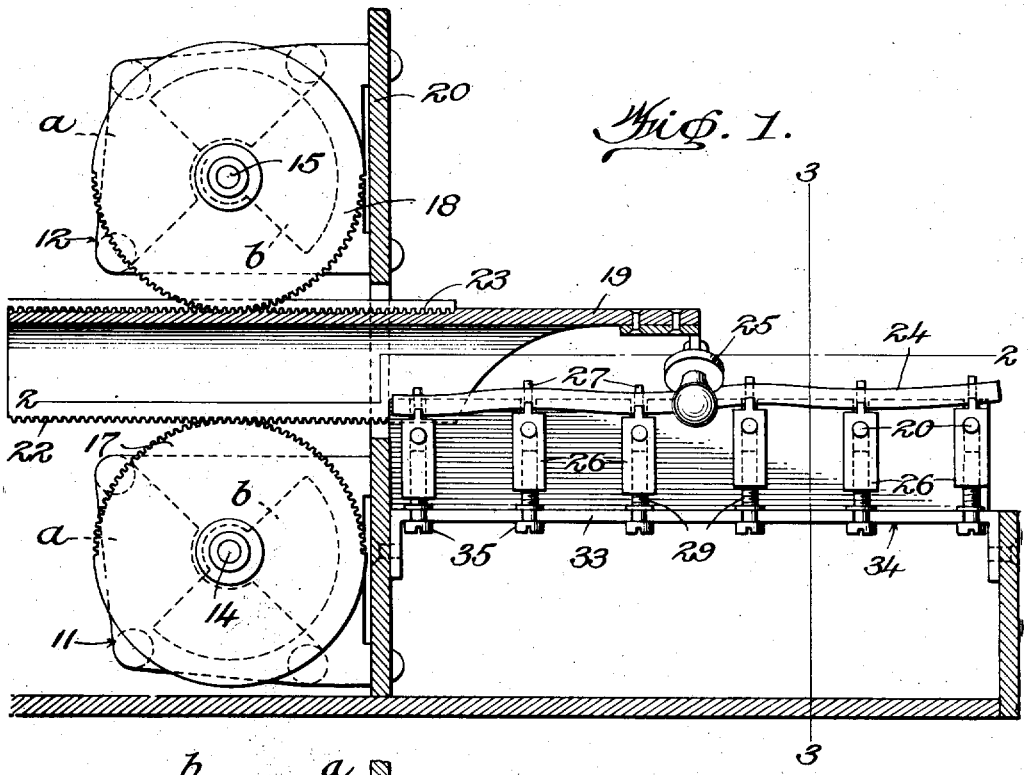
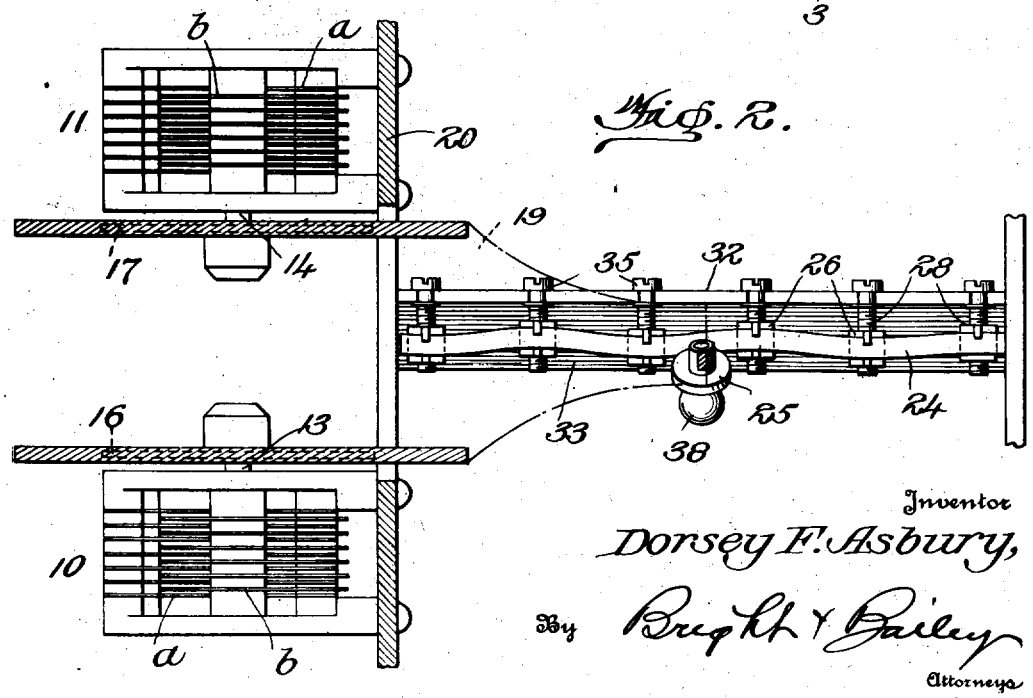
Inventor
Dorsey F. Asbury,
By Bright & Bailey
Attorneys April 7, 1931. D. F. ASBURY Re. 18,023

RADIO APPARATUS

Original Filed Feb. 19, 1926 3 Sheets-Sheet 2

Inventor

Dorsey F. Asbury, by Bright & Bailey

Attorneys

April 7, 1931. D. F. ASBURY Re. 18,023

RADIO APPARATUS

Original Filed Feb. 19, 1926 3 Sheets-Sheet 3

Inventor

Dorsey F. Asbury,

By Bright & Bailey

Attorneys

Reissued Apr. 7, 1931

Re. 18,023

UNITED STATES PATENT OFFICE

DORSEY F. ASBURY, OF BROOMES ISLAND, MARYLAND

RADIO APPARATUS

Original No. 1,605,805, dated November 2, 1926, Serial No. 89,441, filed February 19, 1926. Application for reissue filed May 19, 1927. Serial No. 192,756.

My invention relates to radio apparatus, particularly to receiving sets employing plural tuning units, and my object, generally speaking, is to provide means for operating the movable parts of the tuning units of a receiving set collectively varying amounts with respect to one another, as set forth in my copending applications 683,756 and 72,514, whereby movement of a single operator is all that is necessary to cause all units to tune simultaneously and accurately with different wave lengths.

In my application 683,756 I disclose an operator common to the movable parts of a plurality of tuning units for moving such parts collectively varying amounts with respect to one another, but in said application the operator has only reciprocal movement and I depend upon contacting surfaces of irregular form between the operator and the movable parts to cause the latter to be moved variably while being moved collectively. In my later application 72,514, which possesses certain advantageous features over the arrangement shown in application 683,756, I disclose an operator common to the movable parts of a plurality of tuning units rotatable to move said movable parts collectively and tiltable to different positions in which it is rotatable to move the movable parts individually. In this application, however, as in my application 683,756, I depend upon contacting surfaces of irregular form between the operator and the movable parts to move the latter collectively varying amounts with respect to one another. As an improvement over the arrangements disclosed in my applications just discussed, I illustrate in the present application an operator which remains constantly in driving engagement with the movable parts of the tuning units it is designed to operate and which has a plurality of different forms of movement, each of which is effective to move said movable parts, so that when the operator is moved to combine the different forms of movement thereof it is effective to move the movable parts of the tuning units collectively varying amounts with respect to one another, whereby all of the tuning units may be caused to tune simultaneously with each different wave length encountered during collective movement of the movable parts of the tuning units. I also disclose herein means, specifically a cam, for combining the different forms of movement of the operator to produce the exact amount of movement required of each movable part to cause all units to tune accurately and simultaneously with each different wave length encountered during collective movements of said movable parts. I also now propose to provide adjustable means for varying the movement of the movable parts of the tuning units of a receiving set with respect to one another during collective movements thereof, together with means for adjusting said adjustable means, so that, irrespective of the particular conditions of use of a set, such set may be pretuned to meet those conditions, and whereby, if the conditions of use of the set should change, it may be pretuned to meet the altered conditions of its use, the essential purpose being to enable each individual owner to pretune his set and to ascertain whenever desired the accuracy of adjustment of his pretuning mechanism.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 4:
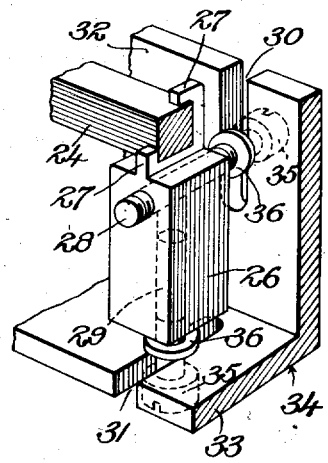
Figure 7:
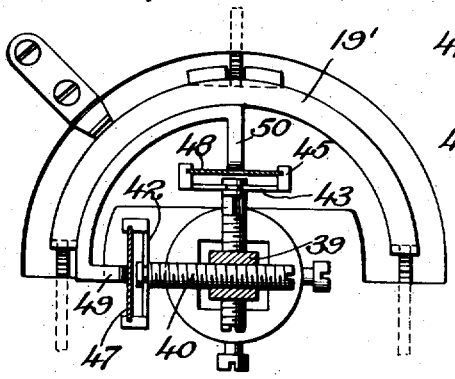
Figure 8:
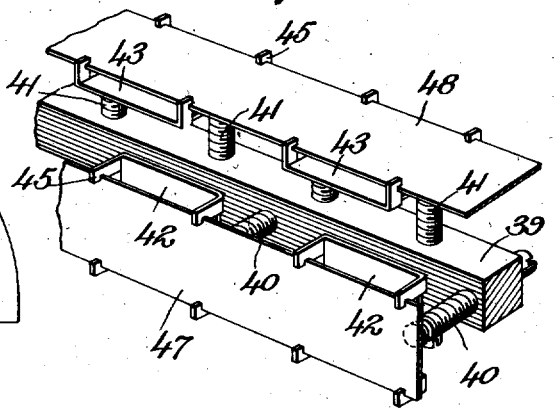
Figure 9:
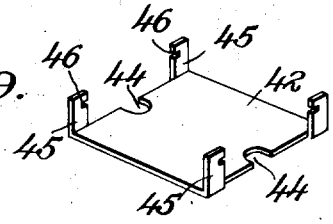
Figure 5:
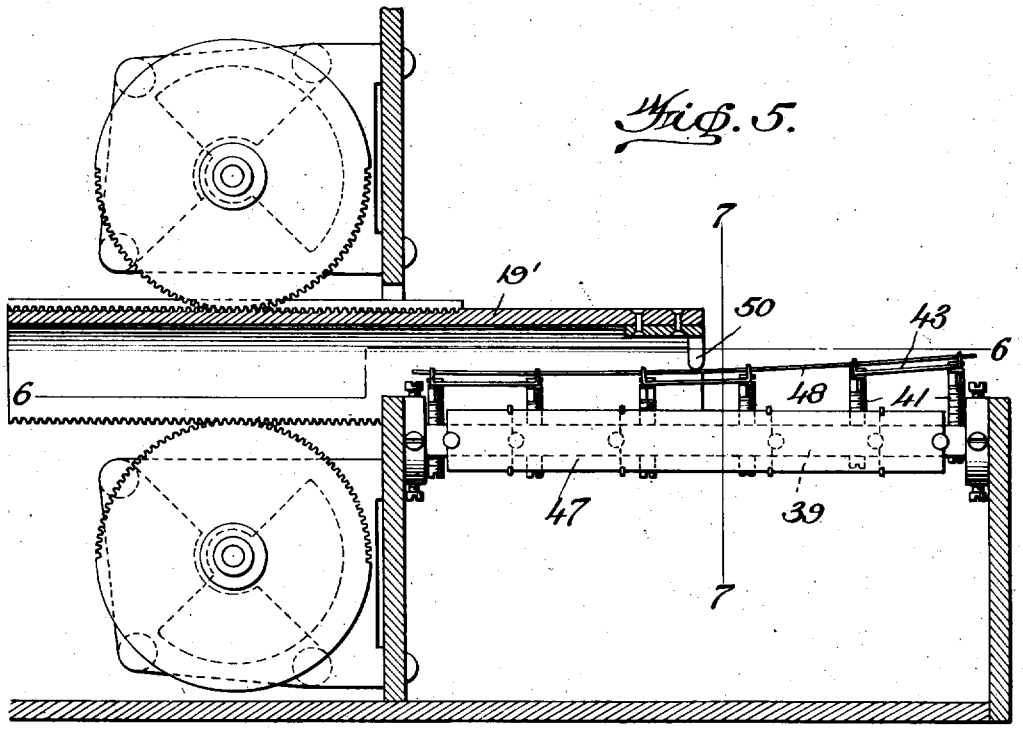
Figure 6:
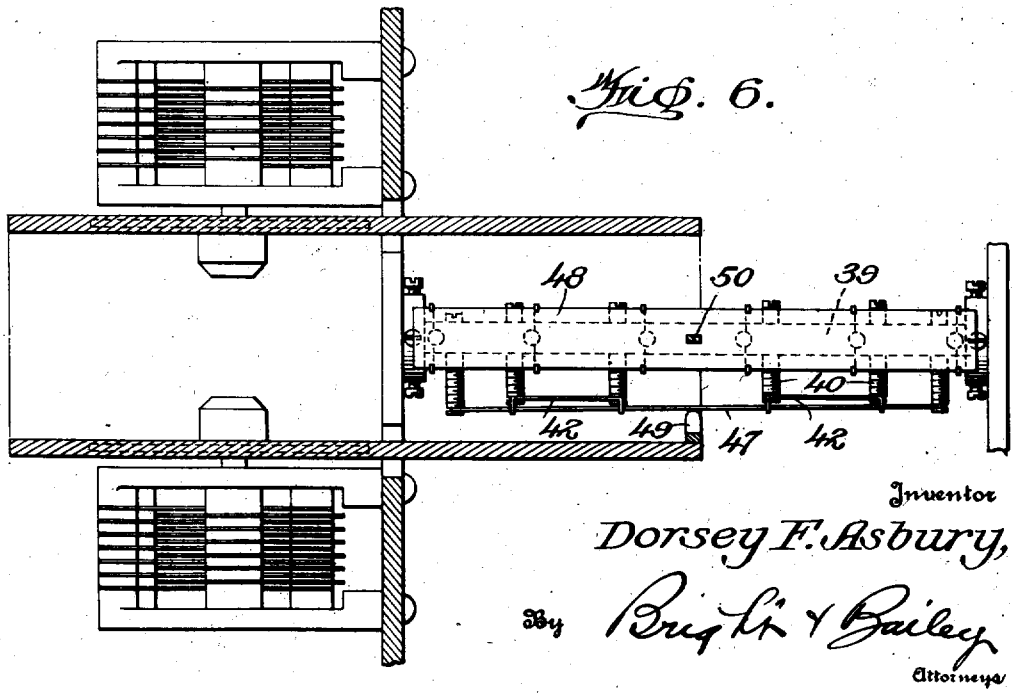

Figure 1 is a vertical longitudinal section through a plural tuning unit receiving set showing a preferred form of the means constituting my present invention embodied therein;

Fig. 2, a horizontal section on the line 2—2 of Fig. 1;

Fig. 3, a vertical transverse section on the line 3—3 of Fig. 1;

Fig. 4, an enlarged detail perspective of a portion of the adjustable control means for the common operator;

Fig. 5, a view similar to Fig. 1 showing a modified form of the means constituting my present invention;

Fig. 6, a horizontal section on the line 6—6 of Fig. 5;

Fig. 7, a section on the line 7—7 of Fig. 5;

Fig. 8, a detail perspective of a portion of the modified form of adjustable control means; and Fig. 9, a detail perspective of one of the elements of the control means shown in Figures 5 to 8.

Referring to the drawings in detail, it will be observed that I have shown my invention embodied in a receiving set employing three tuning units 10, 11 and 12 in the form of variable plate condensers, each including, as is usual, a stator *a* and a rotor *b*, the latter being mounted, respectively, on shafts 13, 14 and 15, which shafts, in accordance with my invention, are equipped, respectively, with spur gears 16, 17, and 18.

Condensers 10, 11 and 12 are mounted in triangular relative relation with the axis of their shafts disposed in a common plane, whereby they are adapted for collective variable operation by an operator such as is indicated generally at 19, said condensers being mounted for example, as shown, upon a panel board 20, one above and between the other two, with the axes of their rotor shafts 13, 14 and 15, respectively, disposed in a common vertical plane and with the shafts of two of them, 10 and 11 for instance, disposed in alinement with one another, so that the common operator 19, which embodies essentially three connected racks 21, 22 and 23 constantly in mesh, respectively, with spur gears 16, 17 and 18, is reciprocable to rotate all rotors *b* collectively and is tiltable to rotate said rotors different amounts with respect to one another, being tiltable in a horizontal plane about its point of contact with either gear 16 or 17 to rotate the other of such gears while the one about which it is tilted remains stationary, and being tiltable in a vertical plane by rocking movement about gears 16 and 17 to rotate gear 18.

By reason of the fact that operator 19 may be moved longitudinally and simultaneously tilted, means may be provided to impart correct tilting movements thereto during longitudinal movement thereof to cause it to rotate each rotor *b* the exact amount required to place all of the tuning units simultaneously and accurately in line with each different wave length encountered by the tuning units during collective movements thereof, said means, in its preferred embodiment illustrated in Figures 1 to 4 consisting of a cam bar 24 engaged by a cam follower 25, preferably a grooved roller, carried by operator 19, so that as said operator is shifted longitudinally to impart rotary movement to rotors *b* collectively, said cam bar will function to tilt said operation as required either in a horizontal or in a vertical plane, or in a combination of such planes, to vary the amount of rotation of said rotors with respect to one another to cause all tuning units to tune accurately with each wave length successively encountered during shifting of the operator.

Cam bar 24 is formed from any suitable pliable material whereby it may be bent to proper shape for correctly tilting operator 19 during longitudinal movement of said operator and in accordance with my present improvements I provide means constantly associated with said bar for bending same to desired shape and for maintaining the shape thereof, whereby each individual owner or user of a receiving set may adjust the operating mechanism thereof to cause all tuning units to tune simultaneously and accurately with different wave lengths irrespective of the particular conditions of use of his set.

The means illustrated in Figures 1 to 4 for bending cam bar 24 and for holding same to shape includes a plurality of blocks 26 of duplicate construction arranged at spaced points longitudinally along said bar and each having fingers 27 firmly gripping said bar. Each block has threaded therein a pair of screws 28, 29 extending at right angles to one another, one being disposed horizontally and the other vertically, and these screws are slidable, respectively, in slots 30, 31 cut in the horizontally and vertically disposed flanges 32, 33, respectively, of a fixed angle bar 34, the head 35 of each screw engaging the outer face of its related flange of said angle bar while an annular flange 36 on each screw engages the inner face of its related flange of said angle bar, whereby said screws have swivel connection with said angle bar, although slidable in the slots 30, 31 thereof, so that upon rotation of any screw in either direction it will react from said angle bar to move the block 26 in which it is threaded and thus bend the cam bar 24. By adjusting the horizontally disposed screws 28, cam bar 24 may be bent to proper shape in a horizontal plane, and by adjusting the vertically disposed screws 29 said cam bar may be bent to proper shape in a vertical plane, screws 29 moving in slots 31 during adjustment of screws 28, and screws 28 moving in slots 30 during adjustment of screws 29.

One portion of roller 25 engages the upper surface of cam bar 24 while another portion thereof engages a vertical surface of said cam bar, a spring 37 secured to panel 20 and bearing against operator 19 holding both portions of said roller constantly in engagement with their related surfaces of said cam bar, so that as said operator is shifted longitudinally to move the movable parts of the tuning units collectively, an irregular shape that may have been imparted to said cam bar by screws 28, 29 will cause said operator to tilt and thereby actuate the movable parts of the tuning units variable amounts with respect to one another.

Due to the triangular arrangement of the contacts between operator 19 and the gears 16, 17 and 18, any tilt of said operator in a horizontal plane about its point of contact with either gear 16 or 17 to rotate the other of such gears manifestly will result also in rotation of gear 18, and therefore some difficulty might arise in attempting to bend cam bar 24 to correct shape when all of the gears 16, 17 and 18 are in contact with operator 19. Therefore, in order to overcome any difficulties in imparting correct shape to cam bar 24, I contemplate first adjusting said bar to tune condensers 10 and 11 correctly with respect to one another and thereafter tuning condenser 12 with respect to condensers 10 and 11 as correctly tuned with respect to one another. In other words, to quickly and easily tune a receiving set such as is shown in the drawings, condenser 12 should be disconnected from operator 19 and said operator should then be moved longitudinally to move the rotors of condensers 10 and 11 collectively until they tune substantially with some wave length being broadcasted. The screw 28 then nearest to roller 25 should then be adjusted to bend cam bar 24 and thereby tilt operator 19 in a horizontal direction until the two condensers 10 and 11 are brought properly in tune with that wave length. Operator 19 then should be moved longitudinally until another wave length being broadcasted is encountered, when adjustments of another screw 28 will serve to impart the proper bend to cam bar 24 in a horizontal plane to cause both condensers 10 and 11 to tune properly with this wave length. In similar manner, operator 19 should be shifted longitudinally until cam bar 24 has been bent properly in a horizontal plane throughout its length, which will cause the rotors of condensers 10 and 11 thereafter to be moved a correct amount with respect to one another whenever operator 19 is shifted longitudinally.

After cam bar 24 has been bent to correct shape in a horizontal plane, condenser 12 is connected by means of its gear 18 with operator 19 and the same procedure repeated in respect to screws 29 to obtain the proper bend of cam bar 24 in a vertical plane, in which connection it will be noted that since condensers 10 and 11 are in tune with one another, due to the adjustments first made to cam bar 24, it follows that for any given longitudinally shifted position of operator 19 and subsequent vertical tilting thereof to bring condenser 12 in tune with any given wave length the result will be that all three condensers will be brought accurately in tune with that wave length. As a consequence, once correct adjustments of cam bar 24 have been effected it is merely necessary to grasp handle 38 and either pull operator 19 out or push same in to bring all condensers into correct tune with any wave length desired, and, if for any reason the conditions under which a particular receiving set is being operated should vary, as for instance, should the antennæ thereof be changed, thereby affecting the relation between the tuning units thereof, cam bar 24 may readily be bent to correct shape by means of the screws 28, 29 to meet the changed conditions under which the set is to be operated.

In Figures 5 to 9 of the drawings I have shown a modified form of pretuning mechanism which essentially is the same as the mechanism of Figures 1 to 4, but which differs from the mechanism of Figures 1 to 4 mainly in that instead of a single cam bar, two separate cam members are employed one for tilting the operator vertically and the other for tilting same horizontally.

In the modified arrangement a fixed bar 39 has threaded therethrough a plurality of pairs of horizontal screws 40 and a plurality of pairs of vertical screws 41, a plate 42 being carried by each pair of horizontal screws and a plate 43 being carried by each pair of vertical screws. Plates 42 and 43 are of rectangular shape and have semi-circular recesses 44 formed in the ends thereof, while each screw has an annular groove formed therein to receive the material surrounding an associated recess 44 whereby swivel connections are provided between said plates and said screws, the result being that by rotation of any given screw the end of the plate with which it has swivel connection may be moved either towards or away from bar 39 as desired. Each plate 42 and 43 has extending at right angles thereto from each of its four corners a finger 45 and each finger has a notch 46 therein, the fingers of plates 42 supporting a thin elongated bendable cam strip 47 and the fingers of plates 43 supporting a similar cam strip 48, said cam strips being received at their free edges in the notches 46 of said fingers whereby movement of plates 42, 43 towards or away from bar 38 by adjustments of screws 40, 41 is effective to correspondingly bend said strips. Cam strip 47 is vertically disposed while cam strip 48 is horizontally disposed, and they are engaged, respectively, by contact members 49, 50 carried by operator 19′, so that upon longitudinal movement of said operator proper tilting movements are imparted thereto to cause the condensers to tune simultaneously and accurately with different wave lengths. Adjustments of the cam strips 47, 48 are effected by means of the screws 40, 41 in the same manner that adjustments of cam bar 24 are effected.

Various departures from the particular arrangement herein disclosed may be made within the spirit and scope of my invention as defined in the appended claims.

I claim:

1. In radio apparatus, more than two adjustable tuning units, a single actuator having different forms of movement, and connections between the actuator and units responsive to a combination of the different forms of movement of the actuator to adjust the units collectively in variable ratio.

2. In radio apparatus, a pair of rotatably adjustable tuning units having their axes of rotation positioned out of alinement, a single actuator having different forms of movement, and connections between the units and actuator responsive to a combination of the different forms of movement of the actuator to adjust the units collectively in variable ratio.

3. In radio apparatus, a plurality of adjustable tuning units, a single actuator having different forms of movement, connections between the actuator and units responsive to a combination of the different forms of movement of the actuator to adjust the units collectively in variable ratio, and means for predetermining the movements of the actuator which are effective to adjust said units collectively in variable ratio.

4. In radio apparatus, a plurality of adjustable tuning units, a single actuator having different forms of movement, connections between the actuator and units responsive to either form of movement of the actuator independently of the other to adjust the units and responsive to a combination of the different forms of movement of the actuator to adjust the units collectively in variable ratio, and means for predetermining the movements of the actuator which are effective to adjust said units collectively in variable ratio.

5. In radio apparatus, a plurality of adjustable tuning units, a single actuator having different forms of movement, connections between the actuator and units responsive to a combination of the different forms of movement of the actuator to adjust the units collectively in variable ratio, and means separate from said connections for predetermining the movements of the actuator which are effective to adjust the units collectively in variable ratio.

6. In radio apparatus, a plurality of adjustable tuning units, a single actuator having different forms of movement, connections between the actuator and units responsive to a combination of the different forms of movement of the actuator to adjust the units collectively in variable ratio, and adjustable means for predetermining the movements of the actuator which are effective to adjust said units collectively in variable ratio.

7. In radio apparatus, a plurality of adjustable tuning units, a single actuator having different forms of movement, connections between the actuator and units responsive to a combination of the different forms of movement of the actuator to adjust the units collectively in variable ratio, and a cam device cooperating with the actuator to predetermine the movements thereof which are effective to collectively adjust the units in variable ratio.

8. In radio apparatus, a plurality of adjustable tuning units, a single actuator having different forms of movement, connections between the actuator and units responsive to a combination of the different forms of movement of the actuator to adjust the units collectively in variable ratio, and an adjustable cam device cooperating with the actuator to predetermine the movements thereof which are effective to collectively adjust the units in variable ratio.

9. In radio apparatus, a plurality of adjustable tuning units, a single movable actuator, connections between the units and actuator responsive to predetermined movement of the actuator to adjust the units collectively in variable ratio, and means for predetermining the movements of the actuator which are effective to adjust the units collectively in variable ratio, said means having operative connection only with the actuator.

10. In radio apparatus, a plurality of adjustable tuning units, a single actuator having different forms of movement, connections between the actuator and units responsive to a combination of the different forms of movement of the actuator to adjust the units collectively in variable ratio, and a single cam device cooperating with the actuator to predetermine the movements thereof which are effective to collectively adjust the units in variable ratio.

11. In radio apparatus, a plurality of adjustable tuning units, a single actuator having different forms of movement one of which is a tilting movement, connections between the actuator and units responsive to a combination of the different forms of movement of the actuator to adjust the units collectively in variable ratio, and means for predetermining the movements of the actuator which are effective to adjust said units collectively in variable ratio.

12. In radio apparatus, a plurality of adjustable tuning units, a single actuator having tilting movements in different planes and connections between the actuator and units individually responsive to the tilting movements of the actuator respectively to adjust the units individually.

13. In radio apparatus, a plurality of adjustable tuning units, a single actuator having different forms of movement, one of which is a reciprocal movement, connections between the actuator and units responsive to a combination of the different forms of movement of the actuator to adjust the units collectively in variable ratio, and means for predetermining the movements of the actuator which are effective to adjust said units collectively in variable ratio.

14. In radio apparatus, a plurality of adjustable tuning units, a single actuator having tilting movements in different planes, and connections between the actuator and units responsive to a combination of the tilting movements of the actuator to adjust the units collectively in variable ratio.

15. In radio apparatus, a plurality of adjustable tuning units, and a single actuator having different forms of movement, said actuator including rack portions in driving connection with the units, respectively, whereby a combination of the different forms of movement of the actuator is effective to adjust the units collectively in variable ratio.

16. In radio apparatus, a plurality of adjustable tuning units, a single actuator having different forms of movement, and elements operatively connected to the actuator and units responsive to a combination of the different forms of movement of the actuator to adjust the units collectively in variable ratio, the operative connection between said elements and the actuator shifting relatively to and longitudinally of the latter during movements of said actuator which are effective to adjust the units collectively.

17. In radio apparatus, a pair of rotatably adjustable tuning units, and a tiltable actuator in the form of a pair of parallel rack bars located between and in driving engagement with said units, said actuator being mounted for reciprocal and tilting movements whereby it is effective by either movement to rotate the units collectively and by a combination of said movements to rotate the units in variable ratio.

18. In radio apparatus, more than two adjustable tuning units, a knob or handle, and means operable solely by said knob or handle to selectively adjust any one of said units individually and also to adjust all of said units collectively.

19. In radio apparatus, more than two adjustable tuning units, a knob or handle, and means operable solely by said knob or handle to selectively adjust either of two of said units individually and also to adjust all of said units collectively.

20. In radio apparatus, more than two adjustable tuning units, a knob or handle, and means extending between the units operable solely through said knob or handle to adjust said units individually.

21. In radio apparatus, a pair of adjustable tuning units, a knob or handle, and means operable solely through said knob or handle to adjust either of said units independently of the other.

22. In radio apparatus, a pair of adjustable tuning units, a knob or handle, and means operable solely through said knob or handle to adjust either of said units independently of the other, and also to adjust both of the units collectively.

23. In radio apparatus, more than two adjustable tuning units, a knob or handle, and means operable solely by said knob or handle to selectively adjust any one of said units individually.

In testimony whereof I hereunto affix my signature.

DORSEY F. ASBURY.